US006839865B2

(12) United States Patent
Gould et al.

(10) Patent No.: US 6,839,865 B2
(45) Date of Patent: Jan. 4, 2005

(54) SYSTEM AND METHOD FOR MULTICAST STREAM FAILOVER

(75) Inventors: Kenneth Gould, Oakton, VA (US); Joo Chung, Centreville, VA (US); Michael Sun, Syracuse, NY (US); Frank Huang, Reston, VA (US)

(73) Assignees: Road Runner, Herndon, VA (US); ServiceCo, LLC, Herndon, VA (US)

( * ) Notice: Subject to any disclaimer, the term of this patent is extended or adjusted under 35 U.S.C. 154(b) by 0 days.

(21) Appl. No.: 09/752,744

(22) Filed: Dec. 29, 2000

(65) Prior Publication Data

US 2003/0142670 A1 Jul. 31, 2003

(Under 37 CFR 1.47)

(51) Int. Cl.[7] .............................................. G06F 11/00
(52) U.S. Cl. ......................................... 714/6; 370/356
(58) Field of Search ................................ 714/6, 13, 11, 714/12, 7, 707, 712; 370/216, 217, 221, 352, 253, 355, 356, 353; 455/500, 502; 709/235, 217, 239

(56) References Cited

U.S. PATENT DOCUMENTS

| | | | |
|---|---|---|---|
| 5,418,937 A | * | 5/1995 | Inoue ........................... 714/47 |
| 5,513,314 A | | 4/1996 | Kandasamy et al. |
| 5,867,653 A | * | 2/1999 | Aras et al. ................... 709/204 |
| 5,974,503 A | | 10/1999 | Venkatesh et al. |
| 6,269,080 B1 | * | 7/2001 | Kumar ......................... 370/236 |
| 6,501,763 B1 | * | 12/2002 | Bhagavath et al. .......... 370/432 |
| 6,507,863 B2 | * | 1/2003 | Novaes ......................... 709/201 |
| 6,539,000 B1 | * | 3/2003 | Murai et al. ................ 370/260 |
| 6,618,373 B1 | * | 9/2003 | Subramaniam ............. 370/390 |

* cited by examiner

*Primary Examiner*—Dieu-Minh Le
(74) *Attorney, Agent, or Firm*—Roberts, Abokhair & Mardula, LLC

(57) ABSTRACT

A system and method for avoiding a single point of failure in the broadcast of streaming data. The system uses multiple redundant servers steaming the exactly same data to a failover device. The failover device buffers the steams into a primary and secondary data stream and automatically switches from the primary to the secondary data stream if it detects a corruption in the primary data stream. Since the buffered data packets of the two steams are identical and are synchronized, there is not outage for multicast receivers when the primary data source fails since there is a switch to exactly the same data in the next packet of the secondary data stream.

36 Claims, 2 Drawing Sheets

US 6,839,865 B2

SYSTEM AND METHOD FOR MULTICAST STREAM FAILOVER

FIELD OF THE INVENTION

This invention relates generally to broadcasting streaming data over a network. More particularly, the present invention is a system for avoiding a single point failure when multicasting a data stream comprising video, audio and other data.

BACKGROUND OF THE INVENTION

Multicast streaming services provide for the continual feed of streaming data, including video, over a network to many different users. The most common application is streaming video across a network system. Audio streaming is another common application. However, these streaming application types are not intended as a limitation. Typically, a particular data stream is multicast from a single server over a network. This allows many people to receive and view the same program simultaneously.

If however, the server becomes unavailable, then the multicast stream which is being served from the server will also be unavailable, thus leading to an outage of service.

Increasingly, the lines between cable television service and serving a data stream over the Internet is becoming blurred. More and more, television-like content is being served to users of the Internet. This is becoming increasingly so in an era where bandwidth is increasing, and is readily available to Internet users. Today, Internet cable, DSL, and other types of high bandwidth lines are readily available to Internet users. Such users are demanding more and more content.

When a web based asset is used to stream video to Internet users, especially multiple users, there are generally two schemes that are employed. First, a unicast of the data stream is made to a single user. In a unicast situation, a single user connects to a website having program content. Upon demand, that program content is served by the web server to the individual user. When multiple users desire a particular program at different times, multiple unicasts of the data are made by the server. However, a single server can only serve a finite number of unicast streams of a given program content.

Multiple streaming servers are used to load balance unicast data to many individual users. If a particular server fails, each user suffers an outage, albeit of differing content initiated at different times. Frequently multiple streaming servers are used in order to achieve load balancing and to allow multiple unicast streams of the same web asset. This approach works well when an equal number of video streams are served from each of the servers. However, if any server goes down, the individuals who are being served from that server will have their service disrupted.

When a streaming server is distributing a video stream in a multicast mode (that is, simultaneous streaming of a video stream by multiple users), rather than in multiple unicast streams, the load on the server is relatively low. This is because a single stream per program is being broadcast by the server to multiple users, therefore multiple interactions with the server are not required for a single program. In a multicast situation, load balancing is not as much of an issue and therefore, multiple servers are not required. These relatively unused stream server resources can be used to increase the program availability by providing redundant servers of the same content.

What would be particularly useful is a system which allows for the unicast or multicast of a video stream with the reliability that is associated with redundancy in the system.

SUMMARY OF THE INVENTION

The present invention is a system and method for harnessing the relatively under utilized streaming servers as redundant servers to minimize user outage due to a server failure particularly under multicast mode.

It is therefore an objective of the present invention to improve the reliability of multicast streaming service over a video cable network.

It is yet another objective of the present invention to improve the reliability of multicast streaming service over networks serving clients.

It is a further objective of the present invention to improve the reliability of unicast broadcasts over client networks and over video networks.

It is a further objective of the present invention to introduce redundancy into the network serving multicast customers to improve reliability.

It is yet another objective of the present invention to ensure that service is not interrupted to cable and network clients who are receiving stream data applications.

The present invention is a system and method that is used in conjunction with redundant multicast servers to enhance the reliability of receipt of data stream desired. The use of two servers is the preferred embodiment although this is not meant as a limitation. More than two servers can be used although it is anticipated that there will not be a corresponding increase in reliability over the architecture that uses two multicast servers. One server broadcasts the primary stream. The other server broadcasts the secondary stream. The secondary stream data content is identical with the primary stream data content.

Each server multicasts the same content at the same time over the same enterprise network that is connected to the monitoring device of the present invention. An enterprise network may be a local area network, wide area network, intranet or any other network whereby the enterprise telecommunicates internally. For purposes of this application, the present invention is a system and method which includes a device that monitors for an adverse change of the primary multicasting server to utilize the secondary stream content when an adverse change is detected. An adverse change is a detected error which may range from corruption in the packet to the absence of the packet itself. This device multicasts the secondary stream content to the users when the primary stream server undergoes an adverse change, including failure. Hence, the device that monitors the two servers is termed a "failover" device.

As noted above, each server multicasts the same content at the same time over the same enterprise network connected to the failover device. The multicast stream from each server is assigned a different IP address and port number. The failover device is configured to select from one of the multicast streams and designates that stream as the primary stream. The failover device designates the second multicast stream as the secondary stream.

The failover device listens for both multicast streams. The device buffers the primary multicast stream packets as well as the secondary multicast stream packets. Under normal conditions, that is no adverse change is detected, the failover device takes a copy of the primary stream data packet to multicast. In the event of a primary stream adverse change, the failover device takes a copy of secondary multicast server to multicast. The failover device overwrites the IP address and Port number in the packet it will multicast with its own virtual IP address and virtual port number. This virtual IP header information replaces the real IP header information that was in the original data packet. The rewritten data packet is then multicast by the failover device. The program data content (other than the IP header information) multicast by the failover device is therefore unaltered from the source data packet. As noted above, the secondary multicast stream packets are buffered but not otherwise used until an adverse change from the primary stream packet is detected.

In this fashion, there is a minimal loss of content to the clients whether the adverse changes are continuous or occasional.

The system of the present invention can be used by any application that employs multicast streaming, including, but not limited to video and audio programming. Further, the present invention finds its best use for multicast traffic which does not have stringent synchronization requirements and which can tolerate a minimal loss of data. Video and audio streams are examples of the type of content that is well suited for this failover methodology.

It should also be noted that while the failover device buffers and multicasts the packets, the failover device itself does not synchronize the multicast stream that is being broadcast by the multiple servers of the present invention. This is separately synchronized between the multicast servers. It does, however, synchronize the packets of data that are to be subsequently multicast.

The failover device may use the packet count information present in the packet header to synchronize the packets received from the primary and secondary multicast servers. This synchronization method is one embodiment and is not meant to be limiting.

DETAILED DESCRIPTION OF THE INVENTION

As noted above, the present invention comprises a failover device monitoring redundant streaming servers in order to ensure reliability and uninterrupted service for viewers of video programs.

Figure 1:
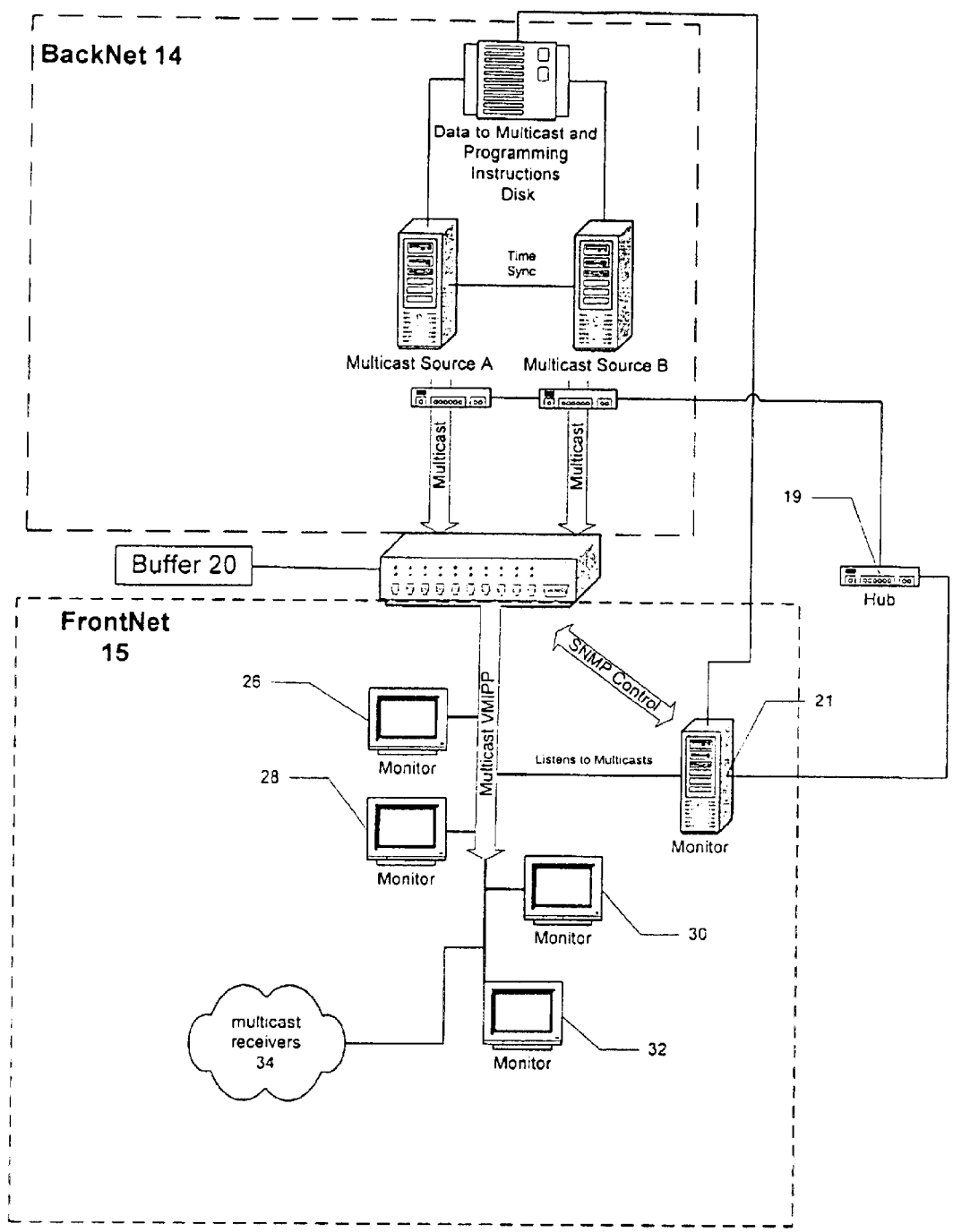
FIG. 1 illustrates the functioning of the failover device.

Referring first to FIG. 1, the functioning of the failover device is illustrated. Multicast server A 10 and multicast server B 12, each multicast the same content over the same enterprise network 14. The two multicast servers each constitute a Real Multicast transmitting a multicast IP address and Port (RMIPP). Each multicast server multicasts stream packets having IP headers associated with the address and port of the associated server. Each RMIPP is unique in order to avoid duplicate network traffic. Thus, in FIG. 1, RMIPP-A represents the multicast channel from multicast server A over which a particular data stream is broadcast. The same video stream is multicast over RMIPP-B which represents the channel over which the same data stream is broadcast but, in this case, from multicast server B 12.

The multicast content is received at the multicast stream failover device 16 which comprises logic to select one of the multicast streams as the primary stream and the other stream as the failover or secondary stream.

The failover device buffers the primary multicast stream packets in buffer 18. Packets received from the secondary stream are buffered in buffer 20 (as more fully explained below). The failover device 16 can distinguish the source of the packets because the IP header information in each packet contains unique RMIPP. If there are no adverse changes detected in the primary data packet, the failover device overwrites the IP header information with its own Virtual Multicast IP address and Port number (VMIPP) in the primary stream packet. If an adverse change is detected, the failover device selects the secondary stream packet, overwriting the IP header information with its own VMIPP.

Thereafter the failover device multicasts the packet comprised of rewritten packets with the new virtual multicast IP address and port number. The source of the packet content is from the primary multicast server if there are no detectable adverse changes in the received packet. Otherwise the source is the secondary multicast server. The failover device will synchronize the packets from the two multicast servers such that the next packet multicast, regardless of the content source, is the packet that sequentially follows the last packet multicast. Thus, the multicast failover device forwards the content stream from either RMIPP-A or RMIPP-B where the IP header is rewritten as VMIPP.

Synchronization of the two video streams is carried out by the servers in communication with one another. Thus, the failover device performs a failover from one RMIPP to another RMIPP in the event that the primary RMIPP has evidence of some adverse change. As noted above, adverse change includes the loss of a packet from a multicast stream as well as corruption of the data. Two multicast sources are synchronized in time and have access to the same source data and programming instructions (either via a shared disk 8 or from independent replicas of the data). By virtue of this synchronization, the servers 10, 12 multicast the same data (differing only in data source information) at the same time. Allowing both sources to be exact replicas makes configuration much simpler and does not require any additional development work to integrate into an architecture supporting Windows Media video multicasts.

Multicast sources 10, 12 can be connected via separate physical ports or the same port depending on what mechanism is used to perform the actual filtering (L2/L3 sourceID filters vs physical port filters).

To provide accurate filtering logic, the system of the present invention optionally provides a Monitor 21 with access to the Programming data from the shared disk 8 (which is preferably in a reduced form which comprises the address and expected bitrate of every active multicast in a given time window).

An optional "sniffer" hub 19 provides a higher level of certainty to the monitor via a second NIC card. Capturing duplicates of all backnet 14 traffic provides the Monitor 21 with a guaranteed view of the backnet 14 status. The certainty comes from additional knowledge concerning whether data loss is truly occurring at the multicast sources versus at the net, switch, or NIC card. It also allows the Monitor 21 to know if switching between sources will actually help (i.e. it can also monitor the non-active (redundant-mode) source whose packets are not forwarded to the frontnet 15 for subsequent distribution to receivers 26, 28, 30, 32, and 34).

Multicast packets on a particular address are forwarded from only one source at a time (i.e. redundant packets from secondary source are filtered out—there is no packet rewriting). Note that while not necessary as long as receiving clients use buffers and can recognize duplicate and misordered packets, it is possible to provide packet-level synchronization with buffering and perhaps some knowledge of the packet format.

The Monitor 21 can control the failover mechanisms in the failover device 16 switch via exposed SNMP controls 24. Threshholding logic in the failover device 16 dictates when such a failover should occur and failover may be at the individual multicast stream or entire multicast source level. Note that while an external Monitor 21 is illustrated, this is not meant as a limitation. For example, the same functionality of filtering duplicate packets based on L2/L3 sourceID or physical port can be implemented within the failover device 16 which can be more flexible since it does not rely upon the limited set of SNMP controls.

Windows Media player, whose capabilities are incorporated herein by reference in their entirety, is capable of handling duplicate and misordered packets via a buffering mechanism so as to overcome the lack of sync at the packet level that would become apparent when a stream is rolled over between sources.

Figure 2:
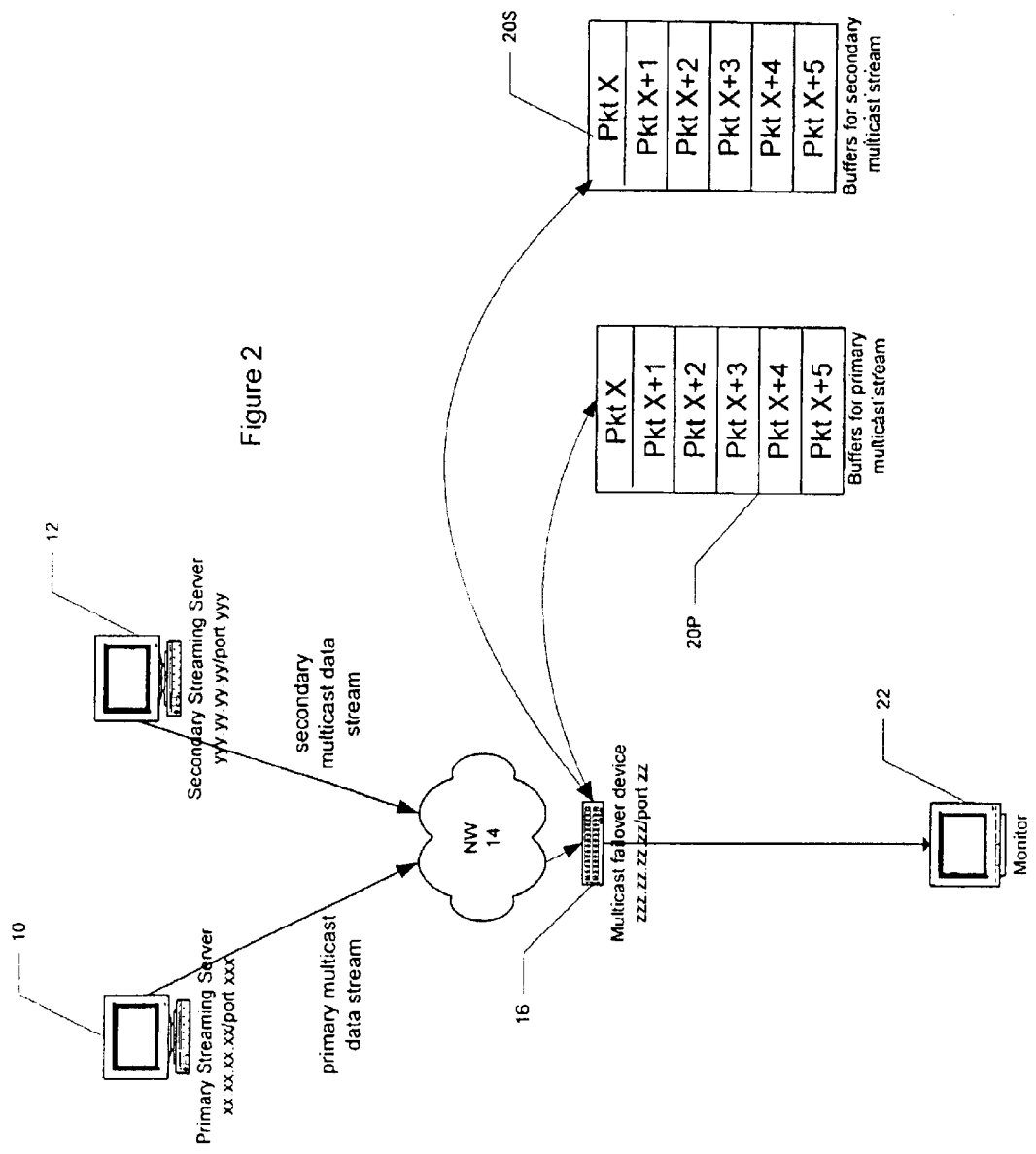
FIG. 2 illustrates the buffering and switching associated with the failover device.

Referring to FIG. 2, the functioning and buffering of multicast content is illustrated. Primary streaming server 10 streams its data content using IP address X.X.X.X at port XX. Secondary streaming server 12 multicasts its data content, which is the same content and is synchronized with the content of primary streaming server 10, using IP address Y.Y.Y.Y at port YY. As noted earlier, these video streams are synchronized with one another. Each video stream, from the primary streaming server and the secondary streaming server, is transmitted over the same enterprise network 14 to the failover device 16.

The work that is sent to the customer, whether audio, video or other work, is the collection of data packets played in a strict sequence. While the packets may be delivered out of sequence, the playing device buffers the packets and orders the playing of the packets according to the packet sequence number found in the packet header area. For purposes of this description, packet content refers to the data viewed or heard by the end user, whereas header data includes IP addresses, port numbers and packet sequence numbers. As discussed below, packet sequence numbers are used to order the packets within the failover device buffers.

Multicast failover device 16 buffers the packet stream both from the primary streaming server 10 and from the secondary streaming server 12. The packets from each are buffered such that the multicast failover device at a point in time has packet with sequence number X from the primary multicast stream and a packet from the secondary multicast stream with identical content and the same sequence number X in a second buffer. Further, the failover device 16 also has packet X+1, packet X+2, packet X+3, packet X+4, etc. from the primary multicast stream as well as packet X+1, packet X+2, packet X+3, and packet X+4, etc. from the secondary multicast stream.

While the multicast failover device does not synchronize the output of the primary and secondary streaming servers, 10, 12, it does synchronize the packets received so that the packets in the failover device buffers, at any point in time, contain the same data content packets in each buffer in the same order. Each buffer's content, assuming no packet defects, should be identical in the respective buffers at the same time.

One method for packet synchronization at the failover device is to use this packet sequence number contained in the packet's header. Each transmitting server numbers each packet. The failover device inserts the received packets into the buffer at a buffer index location corresponding to the packet's number. For example, packet number X from the primary server will be placed in the buffer for the primary server at index location equal to X.

Since programs are sufficiently large, the buffers are periodically recycled and overwritten. The packet number would be mapped by logic that converts the sequence number to an index value using a simple modulus mapping scheme. For example, if the buffers are reused every one hundred packets, the logic to map to the appropriate index would be to divide the sequence number by 100 (modulus 100) and insert the current packet at the index equal to the last two digits of the packet number. In this example the buffer indexes would range from 0 to 99. If the last valid packet seen by the failover device from the primary multicast system is, for example, packet with modulus M, then the failover device will continue broadcasting from the secondary stream buffer with packet with modulus M+1. In this fashion, clients will have continuity in their programs with no discernable interruption.

Failover device 16 rewrites the IP headers with a virtual IP address Z.Z.Z.Z and port number ZZ, which is then multicast to clients on the network.

The system and method where one program is being multicast in parallel with monitoring by a failover device that has remedial capability has been illustrated. Those skilled in the art will appreciate that multiple programs may be broadcast at the same time where each program is under the same redundancy and monitoring system using the same equipment as explained above. Thus the present invention should not be limited to the broadcasting of a redundant single stream of data but to the broadcast of multiple streams of data as well. Thus, the present invention is not intended to be limited to one program broadcast at one time. Multiple programs may be run simultaneously.

A system and method for multicast video stream failovers has been illustrated. It will be appreciated by those skilled in the art that other variations of the architecture illustrated will be possible without departing from the scope of the invention as disclosed.

We claim:

1. A multicast failover device comprising:
   a primary receiver for receiving packets from a primary multicast stream source;
   a secondary receiver for receiving packets from a secondary multicast stream source, wherein the primary receiver and secondary receiver receive packets simultaneously;
   a processor adapted to:
      multicast packets received from the primary multicast stream source over an external network;
      detect an adverse change in a primary stream packet from the primary multicast stream source;
      select a secondary stream packet from the secondary multicast stream source in lieu of the primary stream packet when the adverse change in the primary stream packet is detected; and
      multicast the selected secondary stream packet.

2. The multicast failover device of claim 1 further comprising:
   storage for a primary buffer for storing packets received from the primary multicast stream source; and
   storage for a secondary buffer for storing packets from the secondary multicast stream source.

3. The multicast failover device of claim 2 wherein the processor is further adapted to:
multicast packets from the primary buffer over an external network;
detect an adverse change in a primary buffer packet stored in the primary buffer; and
multicast a secondary buffer packet from the secondary buffer over the external network when the adverse change in the corresponding primary buffer packet is detected.

4. The multicast failover device of claim 3 wherein the processor is further adapted to synchronize the packets in the primary buffer and the secondary buffer.

5. The multicast failover device of claim 3 wherein the processor is further adapted to:
identify the source of the primary stream packet and the primary stream packet's sequential position in a primary multicast stream;
identify the source of the secondary stream packet and the second stream packet's sequential position in a secondary multicast stream;
insert the primary stream packet in the primary buffer at an offset "X" that maps to the primary stream packet's sequential position in the primary multicast stream; and
insert the secondary stream packet in the secondary buffer at an offset "Y" that maps to the secondary stream packet's sequential position in the secondary multicast stream such that the primary buffer packet and the secondary buffer packet at offset "X" are the same and the primary buffer packet and the secondary buffer packet at offset "Y" are the same.

6. The multicast failover device of claim 5 wherein the processor is further adapted to multicast the secondary buffer packet from offset "X" in the secondary buffer when an adverse change is detected in the primary buffer packet located at offset "X" in the primary buffer.

7. The multicast failover device of claim 6 wherein the primary buffer packet comprises a first IP header associated with a primary multicast stream server and wherein the secondary buffer packet comprises a second IP header associated with a second multicast stream server; and wherein the processor is further adapted to:
rewrite the first IP header with a virtual multicast IP address and port number when the primary buffer packet is multicast on the external network; and
rewrite the second IP header with a virtual multicast IP address and port number when the secondary buffer packet is multicast on the external network.

8. The multicast failover device of claim 7 wherein the processor is further adapted to multicast a packet next in a sequential position relative to a last packet multicast by the failover device such that a packet stream multicast by the failover device is continuous and a packet sequence position integrity is maintained.

9. A system for reliable multicasting of streaming data comprising:
a primary multicast stream comprising primary multicast stream packets having a first multicast IP address and port number;
a secondary multicast stream comprising secondary multicast stream packets having a second multicast IP address and port number;
an enterprise network on which the sources for primary multicast stream packets and secondary multicast stream packets are connected;
a multicast failover device connected to the enterprise network comprising a primary receiver for receiving the primary multicast stream packets, a secondary receiver for receiving the secondary multicast stream packets, and an external network for transmitting multicast stream packets to at least one user, wherein the primary receiver and secondary receiver receive packets simultaneously and wherein the multicast failover device is adapted to:
multicast the primary multicast stream packets over the external network;
detect an adverse change in a primary stream packet from the primary multicast stream;
select a secondary multicast stream packet in lieu of the primary multicast stream packet when the adverse change in the primary multicast stream packet is detected; and
multicast the selected secondary multicast stream packet.

10. The system of claim 9 further comprising:
storage for a primary buffer for storing the primary multicast stream packets; and storage for a secondary buffer for storing the secondary multicast stream packets.

11. The system of claim 10 wherein the multicast failover device is further adapted to:
multicast packets from the primary buffer over the external network;
detect an adverse change in a primary buffer stored in the primary buffer; and
multicast a secondary buffer packet from the secondary buffer over the external network when the adverse change in the corresponding primary buffer packet is detected.

12. The system of claim 11 wherein the multicast failover device is further adapted to synchronize the packets in the primary buffer and the secondary buffer.

13. The system of claim 11 wherein the multicast failover device is further adapted to:
identify the primary stream packet and its sequential position in the primary multicast stream;
identify when the secondary stream packet and its sequential position in the secondary multicast stream;
insert the primary stream packet in the primary buffer at an offset "X" that maps to the primary stream packet's sequential position in the primary multicast stream; and
insert the secondary stream packet in the secondary buffer at an offset "Y" that maps to the secondary packet's sequential position in the secondary multicast stream such that the primary buffer packet and the secondary buffer packet at offset "X" are the same and the primary buffer packet and the secondary buffer packet at offset Y are the same.

14. The system of claim 13 wherein the multicast failover device is further adapted to multicast the secondary buffer packet from offset "X" in the secondary buffer when an adverse change is detected in the primary buffer packet located at offset "X" in the primary buffer.

15. The system of claim 13 wherein the multicast failover device is further adapted to:
rewrite the IP address and port number of the primary buffer packet with a virtual IP address and port number when the primary buffer packet is multicast over the external network; and
rewrite the IP address and port number of the secondary buffer with the virtual IP address and port number when the secondary buffer packet is multicast over the external network.

16. The system of claim 15 wherein the multicast failover device is further adapted to multicast a packet next in a sequential position such that a packet stream multicast by the system is continuous and a packet order integrity is maintained irrespective of a buffer location in which the next packet had been stored.

17. A method for reliably multicasting data comprising;
receiving over an enterprise network primary stream packets from a primary multicast stream server, wherein the primary stream packets comprise a first multicast IP address and port number;
receiving over an enterprise network secondary stream packets from a secondary multicast stream server, wherein the secondary stream packets comprise a second multicast IP address and port number, and wherein the secondary stream packets are received simultaneously with the primary stream packets;
multicasting the primary stream packets over an external network;
detecting an adverse change in a primary stream packet from the primary multicast stream server;
multicasting a secondary stream packet over the external network in lieu of multicasting the primary stream packet when the adverse change in the primary stream packet is detected.

18. The method of claim 17 further comprising:
storing packets received from the primary multicast stream server in a primary buffer; and
storing packets from the secondary multicast stream server in a secondary buffer.

19. The method of claim 18 further comprises:
multicasting packets from the primary buffer over an external network;
detecting an adverse change in a primary buffer packet stored in the primary buffer; and
multicasting a secondary buffer packet from the secondary buffer over the external network when the adverse change is detected in the primary buffer packet.

20. The method of claim 19 further comprising synchronizing the packets in the primary buffer and the secondary buffer.

21. The method of claim 20 wherein synchronizing packets in the primary buffer and the secondary buffer comprises:
identifying the primary stream packet's sequential position in a primary multicast stream;
identifying secondary stream packet's sequential position in a secondary multicast stream;
inserting the primary stream packet in the primary buffer at an offset "X" that maps to the primary stream packet's sequential position in the primary multicast stream; and
inserting the secondary stream packet in the secondary buffer at an offset "Y" that maps to the secondary buffer packet's sequential position in the secondary multicast stream such that the primary buffer packet and the secondary buffer packet at offset "X" are the same and the primary buffer packet and the secondary buffer packet at offset "Y" are the same.

22. The method of claim 21 further comprising multicasting the secondary buffer packet from offset "X" in the secondary buffer when an adverse change is detected in the primary buffer packet located at offset "X" in the primary buffer.

23. The method of claim 22 further comprising rewriting IP header information in a packet being multicast on the external network with a virtual multicast IP address and port number when a source of the packet is the primary buffer and when a source of the packet is the secondary buffer.

24. The method of claim 23 further comprising multicasting a packet next in a sequential position relative to a last packet multicast on the external network such that a packet stream multicast is continuous and a packet sequence position integrity is maintained.

25. A multicast failover device comprising:
a processor;
at least one primary receiver for receiving packets from at least one primary multicast stream source;
at least one secondary receiver for receiving packets from at least one secondary multicast stream source;
logic for multicasting packets received by the primary multicast stream source over an external network;
logic for detecting an adverse change in a primary stream packet from the primary multicast stream;
logic for multicasting a secondary stream packet from the secondary multicast stream in lieu of multicasting the primary stream packet from the primary multicast stream when the adverse change in the primary stream packet is detected;
storage for a primary buffer for storing packets received from the primary multicast stream source;
storage for a secondary buffer for storing packets from the secondary multicast stream source;
logic for multicasting packets from the primary buffer over an external network;
logic for detecting an adverse change in a primary buffer packet stored in the primary buffer;
logic for multicasting a secondary buffer packet from the secondary buffer over the external network when the adverse change in the corresponding primary buffer packet is detected; and
logic for synchronizing the packets in the primary buffer and the secondary buffer comprising:
logic for identifying the source of the primary stream packet and the primary stream packet's sequential position in the primary multicast stream;
logic for identifying the source of the secondary stream packet and the second stream packet's sequential position in the secondary multicast stream;
logic for inserting the primary stream packet in the primary buffer at an offset "X" that maps to the primary stream packet's sequential position in the primary multicast stream; and
logic for inserting the secondary stream packet in the secondary buffer at an offset "Y" that maps to the secondary stream packet's sequential position in the secondary multicast stream such that the primary buffer packet and the secondary buffer packet at offset "X" are the same and the primary buffer packet and the secondary buffer packet at offset Y are the same.

26. The multicast failover device of claim 25 further comprising logic for multicasting the secondary buffer packet from offset "X" in the secondary buffer when an adverse change is detected in the primary buffer packet located at offset "X" in the primary buffer.

27. The multicast failover device of claim 26, wherein the primary buffer packet comprises a first IP header associated with a primary multicast stream server and wherein the secondary buffer packets comprise a second IP header associated with a second multicast stream server, and wherein the processor further comprises;

logic for rewriting the first IP header with a virtual multicast IP address and port number when the primary buffer packet is multicast on the external network; and logic for rewriting the second IP header with a virtual multicast IP address and port number when the secondary buffer packet is multicast on the external network.

28. The multicast failover device of claim 27 wherein the processor further comprises logic for multicasting a packet next in a sequential position relative to a last packet multicast by the failover device such that a packet stream multicast by the failover device is continuous and a packet sequence position integrity is maintained.

29. A system for reliable multicasting of streaming data comprising:

primary stream packets having a first multicast IP address and port number;

secondary stream packets having a second multicast IP address and port number;

an enterprise network on which the sources for the primary stream packets and the secondary stream packets are connected; and a multicast failover device connected to the enterprise network comprising:
  a receiver for receiving the primary stream packets;
  a receiver for receiving the secondary stream packets;
  an external network for transmitting multicast stream packets to at least one user;
  logic for multicasting the primary stream packets over the external network;
  logic for detecting an adverse change in a primary stream packet from the primary stream;
  logic for multicasting a secondary stream packet over the external network in lieu of multicasting the primary multicast stream packet when the adverse change in the primary stream packet is detected;
  storage for a primary buffer for storing the primary multicast stream packets;
  storage for a secondary buffer for storing the secondary multicast stream packets;
  logic for multicasting a primary buffer packet from the primary buffer over the external network;
  logic for detecting an adverse change in the primary buffer packet;
  logic for multicasting a secondary buffer packet over the external network when the adverse change in the corresponding primary buffer packet is detected; and
  logic for synchronizing the packets in the primary buffer and the secondary buffer comprising;
    logic for identifying the primary stream packet and its sequential position in the primary stream;
    logic for identifying when the secondary stream packet and its sequential position in the secondary stream;
    logic for inserting the primary stream packet in the primary buffer at an offset "X" that maps to the primary stream packet's sequential position in the primary multicast stream; and
    logic for inserting the secondary stream packet in the secondary buffer at an offset "Y" that maps to the secondary stream packet's sequential position in the secondary multicast stream such that the primary buffer packet and the secondary buffer packet at offset "X" are the same and the primary buffer packet and the secondary buffer packet at offset Y are the same.

30. The system of claim 29 wherein the multicast failover device further comprises logic for multicasting the secondary buffer packet from offset "X" in the secondary buffer when an adverse change is detected in the primary buffer packet located at offset "X" in the primary buffer.

31. The system of claim 30 further comprising:
  logic for rewriting the IP address and port number of the primary buffer packet with a virtual IP address and port number when the primary buffer packet is multicast over the external network; and
  logic for rewriting the IP address and port number of the secondary buffer packet with the virtual IP address and port number when a secondary buffer packet is multicast over the external network.

32. The system of claim 31 further comprising logic for multicasting a packet next in a sequential position such that a packet stream multicast by the system is continuous and a packet order integrity is maintained irrespective of the buffer location that the packet had been stored.

33. A method for reliably multicasting data comprising:
  receiving over an enterprise network primary stream packets from a primary multicast stream server, wherein the primary stream packets comprise a first multicast IP address and port number;
  receiving over an enterprise network secondary stream packets from a secondary multicast stream server, wherein the secondary stream packets comprise a second multicast IP address and port number;
  multicasting the primary stream packets over an external network; detecting an adverse change in a primary stream packet;
  multicasting a secondary stream packet over the external network in lieu of multicasting the primary stream packet when the adverse change in the primary stream packet is detected;
  storing packets received from the primary multicast stream server in a primary buffer;
  storing packets from the secondary multicast stream server in a secondary buffer;
  multicasting packets from the primary buffer over an external network;
  detecting an adverse change in a primary buffer packet stored in the primary buffer;
  multicasting a secondary buffer packet from the secondary buffer over the external network when the adverse change is detected in the primary buffer packet; and
  synchronizing the packets in the primary buffer and the secondary buffer, wherein synchronizing packets in the primary buffer and the secondary buffer comprises;
    identifying the primary stream packet's sequential position in the primary multicast stream;
    identifying the secondary stream packet's sequential position in the secondary multicast stream;
    inserting the primary stream packet in the primary buffer at an offset "X" that maps to the primary stream packet's sequential position in the primary multicast stream; and
    inserting the secondary stream packet in the secondary buffer at an offset "Y" that maps to the secondary stream packet's sequential position in the secondary multicast stream such that the primary buffer packet and the secondary buffer packet at offset "X" are the same and the primary buffer packet and the secondary buffer packet at offset "Y" are the same.

34. The method of claim 33 further comprises multicasting the secondary buffer packet from offset "X" in the secondary buffer when an adverse change is detected in the primary buffer packet located at offset "X".

35. The method of claim 34 further comprises rewriting IP header information in a packet being multicast on the external network with a virtual multicast IP address and port number when a source of the packet is the primary buffer and when a source of the packet is the secondary buffer.

36. The method of claim 35 further comprises multicasting a packet next in a sequential position relative to a last packet multicast on the external network such that a packet stream multicast is continuous and a packet sequence position integrity is maintained.

* * * * *